Patented June 14, 1932

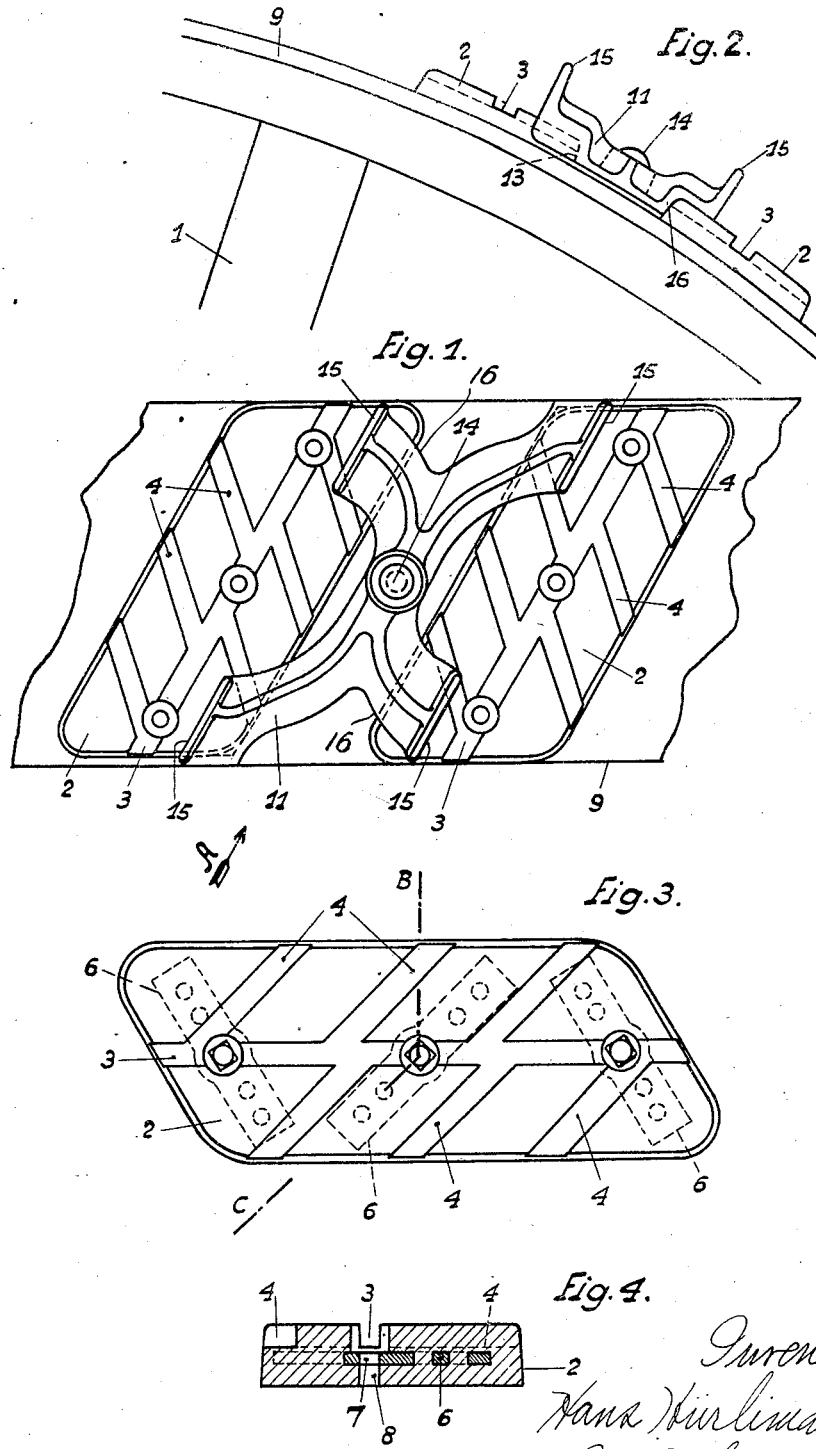

1,863,481

UNITED STATES PATENT OFFICE

HANS HÜRLIMANN, OF WIL, SWITZERLAND

TREAD DEVICE FOR VEHICLE WHEELS

Application filed May 27, 1930, Serial No. 456,216, and in Switzerland July 6, 1929.

The present invention relates to detachable tread devices for the wheels of tractors, lorries and the like, said tread devices comprising tread plates and preferably also detachable calkin members.

A novel feature of the invention is that the tread plates, which are preferably of rubber, are provided with metal inserts through which screws serving to fasten the tread plates to the periphery of the wheel can be passed, whereby the tread plates remain firmly attached to the wheel even under considerable stresses. The tread plates are spaced apart at regular distances around the periphery of the wheel and are arranged at an angle to the axis of rotation of the latter. Preferably grooves are provided on the tread surfaces of the plates. In order to enable the wheel to grip on very soft ground, calkin members may be provided between consecutive tread plates, the said calkin members bearing against the tread plates and serving not only as an additional means for securing said plates to the wheel but being also themselves secured in place by the plates. The calkin members are each detachably secured to the periphery of the wheel as by means of a screw which can be readily removed when it is desired to detach the calkin members.

An example of construction is shown in the accompanying drawing wherein:—

Fig. 1 is a view of a portion of the periphery of a wheel to which tread plates according to the invention have been applied, Fig. 2 is an edge view looking in the direction of the arrow A (Fig. 1), Fig. 3 is a plan view of a tread plate. and Fig. 4 is a section on the line B—C of Fig. 3.

The tread device of the wheel 1 comprises tread plates 2 consisting of rubber or a rubber-like synthetic material. The plates 2 are arranged at an angle to the axis of rotation of the wheel. The said plates are provided with metal inserts 6 through which fixing screws are passed for securing the plates to the wheel periphery.

These inserts 6 are provided with apertures 7 arranged co-axially with holes 8 in the rubber plates and through which fixing screws are passed by means of which the plates 2 are secured to the felly 9 of the wheel 1. The metal inserts are advantageously provided with rectangular holes in order to secure the fixing screws or bolts against rotation. Grooves 3, 4 are provided in the tread surfaces of the plates in order to assist the surfaces to obtain a better grip on the ground.

In order to allow of progress being made over very soft ground a calkin member 11 of cast steel or the like is fastened by means of a screw between consecutive tread plates 2. The calkin member 11 is provided with side arms 13 engaging over the side walls of the plates 2 and is also provided with flanges 16 on its inner side bearing against the opposing edges of the tread plates so that the calkin members, although only being secured to the felly 9 by a single screw, such as 14, are prevented from rotating. The calkin members 11 are provided with outwardly directed projections 15 for penetrating into the ground. These calkin members can readily be removed as only one screw has to be released in each case.

What I wish to secure by U. S. Letters Patent is:—

In tread devices for vehicle wheels, the combination of a pair of tread plates spaced apart and secured transversely on a wheel felly and a calkin member arranged between and bearing on the tread plates and detachably secured to the felly, said calkin member having flanges on its inner side bearing against the opposing edges of the tread plates and also having flanges at its ends engaging over the ends of the tread plates.

In testimony whereof I affix my signature.

HANS HÜRLIMANN.